United States Patent
Hamlin et al.

(10) Patent No.: US 11,916,965 B2
(45) Date of Patent: Feb. 27, 2024

(54) PLATFORM FRAMEWORK POLICY MANAGEMENT

(71) Applicant: Dell Products, L.P., Round Rock, TX (US)

(72) Inventors: Daniel L. Hamlin, Round Rock, TX (US); Vivek Viswanathan Iyer, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 366 days.

(21) Appl. No.: 17/355,289

(22) Filed: Jun. 23, 2021

(65) Prior Publication Data

US 2022/0417284 A1    Dec. 29, 2022

(51) Int. Cl.
*H04L 9/40*        (2022.01)

(52) U.S. Cl.
CPC .................... *H04L 63/20* (2013.01)

(58) Field of Classification Search
CPC ....... H04L 63/20; H04L 63/107; G06F 21/45; G06F 21/33
USPC .......................................................... 726/1
See application file for complete search history.

(56) References Cited

U.S. PATENT DOCUMENTS

| | | | |
|---|---|---|---|
| 10,938,743 B1* | 3/2021 | Andrews | H04L 47/822 |
| 2007/0185980 A1* | 8/2007 | Abraham | H04L 41/0894 709/222 |
| 2014/0259094 A1* | 9/2014 | Narayanaswamy | H04L 63/1425 726/1 |
| 2015/0026758 A1* | 1/2015 | Payyappilly | H04W 12/033 726/1 |
| 2017/0068261 A1* | 3/2017 | Hsu | G06F 1/206 |
| 2018/0224871 A1* | 8/2018 | Sahu | G06F 1/206 |
| 2019/0379656 A1* | 12/2019 | Gore | H04L 63/0815 |
| 2022/0417284 A1* | 12/2022 | Hamlin | H04L 63/20 |

* cited by examiner

*Primary Examiner* — Kambiz Zand
*Assistant Examiner* — Aubrey H Wyszynski
(74) *Attorney, Agent, or Firm* — Fogarty LLP (57) ABSTRACT

Embodiments of systems and methods for platform framework policy management are described. A platform framework may receive, from an application of an IHS (Information Handling System), a registration as a user of a platform policy that is used to operate one or more of the hardware devices of the IHS. A platform framework of the IHS provides the application with a reference to the platform policy. In response to notifications of updates to the platform policy, the platform framework identifies the application as a registered user of the platform policy and provides the application with a reference to the updated platform policy. The platform policy may include a communication handle by which the policy is retrieved, where the handle may include a token that validates the authenticity of the platform policy.

20 Claims, 4 Drawing Sheets

PLATFORM FRAMEWORK POLICY MANAGEMENT

FIELD

The present disclosure relates generally to Information Handling Systems (IHSs), and more particularly, to systems and methods for supporting the use of various internal components of IHSs.

BACKGROUND

As the value and use of information continue to increase, individuals and businesses seek additional ways to process and store it. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

SUMMARY

Embodiments of systems and methods for platform framework policy management are described. In an illustrative, non-limiting embodiment, an Information Handling System (IHS) may include a plurality of hardware devices, each operated at least in part according to one or more platform policies, and each accessed using one or more registered participants of a platform framework. IHS embodiments may further include a processor and a memory coupled to the processor, the memory having program instructions stored thereon that, upon execution, cause the platform framework to: receive, from an application of the IHS, a registration as a user of a first platform policy that is used to operate one or more of the hardware devices of the IHS; provide the application with a reference to the first platform policy; receive a notification of an updated first platform policy; identify the application as a registered user of the first platform policy; and provide the application with a reference to the updated first platform policy.

In additional IHS embodiments, the application of the IHS comprises an application operating in a secure execution environment of an embedded controller of the IHS. In additional IHS embodiments, the reference to a first platform policy comprises a first communication handle by which the first platform policy is retrieved by the IHS application and the reference to the updated first platform policy comprises a second communication handle by which the updated first platform policy is retrieved by the IHS application. In additional IHS embodiments, the first communication handle comprises a token that validates the authenticity of the first platform policy. In additional IHS embodiments, the first platform policy comprises a thermal policy that specifies a temperature threshold for initiating throttling of processing resources of the IHS. In additional IHS embodiments, the thermal policy is updated by a BIOS of the IHS and wherein the thermal policy is further updated by an operating system of the IHS. In additional IHS embodiments, the first platform policy comprises a user presence detection policy that specifies thresholds for determining whether a user is in proximity to the IHS. In additional IHS embodiments, the thresholds of the user presence detection policy comprise a threshold distance of a detected individual from the IHS for signaling that the individual is in proximity to the IHS. In additional IHS embodiments, the user presence detection policy further specifies one or more of the hardware devices of the IHS that are to be utilized in user presence detection by the IHS. In additional IHS embodiments, the first platform policy comprises a display policy that specifies settings to be utilized by one or more displays of the IHS. In additional IHS embodiments, the display policy settings comprise settings for dimming outputs by the one or more displays of the IHS. In additional IHS embodiments, the display policy settings comprise settings for adjusting the resolution of outputs of the one or more displays of the IHS. In additional IHS embodiments, the first platform policy comprises a logging policy that specifies logging levels to be utilized by one or more of the hardware devices of the IHS. In additional IHS embodiments, the first platform policy comprises a network policy that specifies one or more networks that are authorized for use by the IHS. In additional IHS embodiments, the first platform policy comprises an authentication policy that specifies one or more of the hardware devices of the IHS to be utilized in authenticating a user of the IHS.

In various additional embodiments, memory storage devices include program instructions stored thereon that, upon execution by an Information Handling System (IHS), cause the IHS to: receive, from an application of the IHS, a registration as a user of a first platform policy that is used to operate one or more of the hardware devices of the IHS; provide, by a platform framework of the IHS, the application with a reference to the first platform policy; receive a notification of an updated first platform policy; identify, by the platform framework of the IHS, the application as a registered user of the first platform policy; and provide, by the platform framework of the IHS, the application with a reference to the updated first platform policy. In additional memory storage device embodiments, the first communication handle comprises a token that validates the authenticity of the first platform policy. In additional memory storage device embodiments, the first platform policy comprises a thermal policy that specifies a temperature threshold for initiating throttling of processing resources of the IHS.

In various additional embodiments, methods may include: receiving, from an application of an IHS (Information Handling System), a registration as a user of a first platform policy that is used to operate one or more of the hardware devices of the IHS; providing, by a platform framework of the IHS, the application with a reference to the first platform policy; receiving a notification of an updated first platform policy; identifying, by the platform framework of the IHS, the application as a registered user of the first platform policy; and providing, by the platform framework of the IHS, the application with a reference to the updated first platform policy. In additional method embodiments, the first communication handle comprises a token that validates the authenticity of the first platform policy.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

In this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price.

An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

Figure 1:
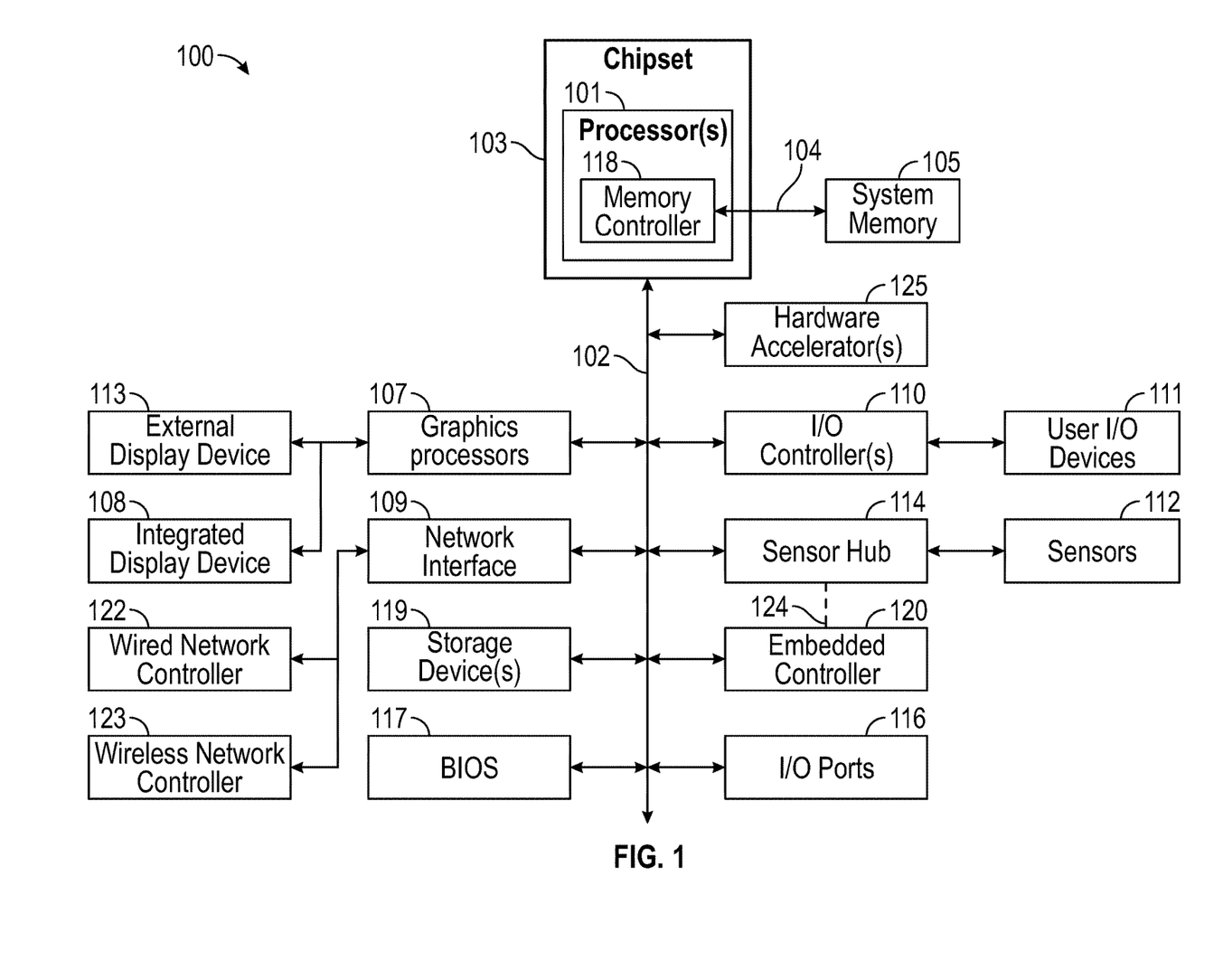
FIG. 1 is a block diagram of an example of hardware components of an Information Handling System (IHS) configured to support management of policies for the operation of platform framework resources of the IHS, according to some embodiments.

FIG. 1 is a block diagram illustrating components of IHS 100 configured to support management of policies for the operation of platform framework resources of the IHS 100. As shown, IHS 100 includes one or more processor(s) 101, such as a Central Processing Unit (CPU), that execute code retrieved from system memory 105. Although IHS 100 is illustrated with a single processor, other embodiments may include two or more processors, that may each be configured identically, or to provide specialized processing operations. Processor(s) 101 may include any processor capable of executing instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

In the embodiment of FIG. 1, processor(s) 101 includes integrated memory controller 118 that may be implemented directly within its circuitry. Alternatively, memory controller 118 may be a separate integrated circuit that is located on the same die as processor(s) 101. Memory controller 118 may be configured to manage the transfer of data to and from system memory 105 of IHS 100 via high-speed memory interface 104.

System memory 105 is coupled to processor(s) 101 and provides processor(s) 101 with a high-speed memory that may be used in the execution of computer program instructions. For example, system memory 105 may include memory components, such as static RAM (SRAM), dynamic RAM (DRAM), NAND Flash memory, suitable for supporting high-speed memory operations by the processor 101. In certain embodiments, system memory 105 may combine both persistent, non-volatile, and volatile memor(ies). In certain embodiments, system memory 105 may include multiple removable memory modules.

IHS 100 utilizes chipset 103 that may include one or more integrated circuits coupled to processor(s) 101. In this embodiment, processor(s) 101 is depicted as a component of chipset 103. In other embodiments, all of chipset 103, or portions of chipset 103 may be implemented directly within the integrated circuitry of processor(s) 101. Chipset 103 provides processor(s) 101 with access to a variety of resources accessible via bus 102. In IHS 100, bus 102 is illustrated as a single element. However, other embodiments may utilize any number of separate buses to provide the illustrated pathways served by bus 102.

In various embodiments, IHS 100 may include one or more I/O ports 116 that may support removeable couplings with various types of external devices and systems, including removeable couplings with peripheral devices that may be configured for operation by a particular user of IHS 100. For instance, I/O 116 ports may include USB (Universal Serial Bus) ports, by which a variety of external devices may be coupled to IHS 100. In addition to, or instead of USB ports, I/O ports 116 may include various types of physical I/O ports that are accessible to a user via an enclosure or chassis of IHS 100.

In certain embodiments, chipset 103 may additionally utilize one or more I/O controllers 110 that may each support the operation of hardware components such as user I/O devices 111. User I/O devices 111 may include peripheral components that are physically coupled to I/O port 116 and/or peripheral components wirelessly coupled to IHS 100 via network interface 109.

In various implementations, I/O controller 110 may support the operation of one or more user I/O devices 110 such as a keyboard, mouse, touchpad, touchscreen, microphone, speakers, camera and other input and output devices that may be coupled to IHS 100. User I/O devices 111 may interface with an I/O controller 110 through wired or wireless couplings supported by IHS 100. In some cases, I/O controllers 110 may support configurable operation of supported peripheral devices, such as user I/O devices 111.

As illustrated, a variety of additional resources may be coupled to processor(s) 101 of IHS 100 through chipset 103. For instance, chipset 103 may be coupled to network interface 109 to enable different types of network connectivity. IHS 100 may also include one or more Network Interface Controllers (NICs) 122 and 123, each of which may implement the hardware required for communicating via a specific networking technology, such as Wi-Fi, BLUETOOTH, Ethernet and mobile cellular networks (e.g., CDMA, TDMA, LTE). Network interface 109 may support network connections by wired network controller(s) 122 and wireless network controller(s) 123. Each network controller 122 and 123 may be coupled via various buses to chipset 103 to support different types of network connectivity, such as the network connectivity utilized by IHS 100.

Chipset 103 may also provide access to one or more display device(s) 108 and/or 113 via graphics processor(s) 107. Graphics processor(s) 107 may be included within a video card, graphics card, and/or an embedded controller installed within IHS 100. Additionally, or alternatively, graphics processor(s) 107 may be integrated within processor(s) 101, such as a component of a system-on-chip (SoC). Graphics processor(s) 107 may generate display information and provide the generated information to display device(s) 108 and/or 113.

One or more display devices 108 and/or 113 are coupled to IHS 100 and may utilize LCD, LED, OLED, or other display technologies (e.g., flexible displays, etc.). Each display device 108 and 113 may be capable of receiving touch inputs such as via a touch controller that may be an embedded component of the display device 108 and/or 113 or graphics processor(s) 107, for example, or may be a separate component of IHS 100 accessed via bus 102. In some cases, power to graphics processor(s) 107, integrated display device 108 and/or external display 133 may be turned off or configured to operate at minimal power levels in response to IHS 100 entering a low-power state (e.g., standby).

As illustrated, IHS 100 may support integrated display device 108, such as a display integrated into a laptop, tablet, 2-in-1 convertible device, or mobile device. IHS 100 may also support use of one or more external displays 113, such as external monitors that may be coupled to IHS 100 via various types of couplings, such as by connecting a cable from the external display 113 to external I/O port 116 of the IHS 100, via wireless docking station, etc. In certain scenarios, the operation of integrated displays 108 and external displays 113 may be configured for a particular user. For instance, a particular user may prefer specific brightness settings that may vary the display brightness based on time of day and ambient lighting conditions.

Chipset 103 also provides processor(s) 101 with access to one or more storage devices 119. In various embodiments, storage device 119 may be integral to IHS 100 or may be external to IHS 100. Moreover, storage device 119 may be accessed via a storage controller that may be an integrated component of the storage device.

Generally, storage device 119 may be implemented using any memory technology allowing IHS 100 to store and retrieve data. For instance, storage device 119 may be a magnetic hard disk storage drive or a solid-state storage drive. In certain embodiments, storage device 119 may be a system of storage devices, such as a cloud system or enterprise data management system that is accessible via network interface 109.

As illustrated, IHS 100 also includes Basic Input/Output System (BIOS) 117 that may be stored in a non-volatile memory accessible by chipset 103 via bus 102. Upon powering or restarting IHS 100, processor(s) 101 may utilize BIOS 117 instructions to initialize and test hardware components coupled to the IHS 100. Under execution, BIOS 117 instructions may facilitate the loading of an operating system (OS) (e.g., WINDOWS, MACOS, iOS, ANDROID, LINUX, etc.) for use by IHS 100.

BIOS 117 provides an abstraction layer that allows the operating system to interface with the hardware components of the IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

As illustrated, certain IHS 100 embodiments may utilize sensor hub 114 (e.g., INTEL Sensor Hub or "ISH," etc.) capable of sampling and/or collecting data from a variety of hardware sensors 112. For instance, sensors 112, may be disposed within IHS 100, and/or display 110, and/or a hinge coupling a display portion to a keyboard portion of IHS 100, and may include, but are not limited to: electric, magnetic, hall effect, radio, optical, infrared, thermal, force, pressure, touch, acoustic, ultrasonic, proximity, position, location, angle (e.g., hinge angle), deformation, bending (e.g., of a flexible display), orientation, movement, velocity, rotation, acceleration, bag state (in or out of a bag), and/or lid sensor(s) (open or closed).

In some cases, one or more sensors 112 may be part of a keyboard or other input device. Processor(s) 101 may be configured to process information received from sensors 112 through sensor hub 114, and to perform methods for prioritizing the pre-loading of applications with a constrained memory budget using contextual information obtained from sensors 112.

For instance, during operation of IHS 100, the user may open, close, flip, swivel, or rotate display 108 to produce different IHS postures. In some cases, processor(s) 101 may be configured to determine a current posture of IHS 100 using sensors 112 (e.g., a lid sensor, a hinge sensor, etc.). For example, in a dual-display IHS implementation, when a first display 108 (in a first IHS portion) is folded against a second display 108 (in a second IHS portion) so that the two displays have their backs against each other, IHS 100 may be said to have assumed a book posture. Other postures may include a table posture, a display posture, a laptop posture, a stand posture, or a tent posture, depending upon whether IHS 100 is stationary, moving, horizontal, resting at a different angle, and/or its orientation (landscape vs. portrait).

For instance, in a laptop posture, a first display surface of a display 108 may be facing the user at an obtuse angle with respect to a second display surface of a display 108 or a physical keyboard portion. In a tablet posture, a first display surface may be at a straight angle with respect to a second display surface or a physical keyboard portion. And, in a book posture, a first display surface may have its back (e.g., chassis) resting against the back of a second display surface or a physical keyboard portion.

It should be noted that the aforementioned postures and their various respective keyboard states are described for sake of illustration only. In different embodiments, other postures may be used, for example, depending upon the type of hinge coupling the displays, the number of displays used, or other accessories.

In other cases, processor(s) 101 may process user presence data received by sensors 112 and may determine, for example, whether an IHS's end-user is present or absent. Moreover, in situations where the end-user is present before IHS 100, processor(s) 101 may further determine a distance of the end-user from IHS 100 continuously or at predetermined time intervals. The detected or calculated distances may be used by processor(s) 101 to classify the user as being in the IHS's near-field (user's position<threshold distance A), mid-field (threshold distance A<user's position<threshold distance B, where B>A), or far-field (user's position>threshold distance C, where C>B) with respect to IHS 100 and/or display 108.

More generally, in various implementations, processor(s) 101 may receive and/or produce context information using sensors 112 via sensor hub 114, including one or more of, for example: a user's presence or proximity state (e.g., present, near-field, mid-field, far-field, and/or absent using a Time-of-Flight or "ToF" sensor, visual image sensor, infrared sensor, and/or other suitable sensor 112), a facial expression of the user (e.g., usable for mood or intent classification), a direction and focus of the user's gaze, a user's hand gesture, a user's voice, an IHS location (e.g., based on the location of a wireless access point or Global Positioning System, etc.), IHS movement (e.g., from an accelerometer or gyroscopic sensor), lid state (e.g., of a laptop or other hinged form factor), hinge angle (e.g., in degrees), IHS posture (e.g., laptop, tablet, book, tent, display, etc.), whether the IHS is coupled to a dock or docking station (e.g., wired or wireless), a distance between the user and at least one of: the IHS, the keyboard, or a display coupled to the IHS, a type of keyboard (e.g., a physical keyboard integrated into IHS 100, a physical keyboard external to IHS 100, or an on-screen keyboard), whether the user operating the keyboard is typing with one or two hands (e.g., by determine whether or not the user is holding a stylus, or the like), a time of day, software application(s) under execution in focus for receiving keyboard input, whether IHS 100 is inside or outside of a carrying bag or case, a level of ambient lighting, a battery charge level, whether IHS 100 is operating from battery power or is plugged into an AC power source (e.g., whether the IHS is operating in AC-only mode, DC-only mode, or AC+DC mode), a power mode or rate of power consumption of various components of IHS 100 (e.g., CPU 101, GPU 107, system memory 105, etc.).

In certain embodiments, sensor hub 114 may be an independent microcontroller or other logic unit that is coupled to the motherboard of IHS 100. Sensor hub 114 may be a component of an integrated system-on-chip incorporated into processor(s) 101, and it may communicate with chipset 103 via a bus connection such as an Inter-Integrated Circuit ($I^2C$) bus or other suitable type of bus connection. Sensor hub 114 may also utilize an $I^2C$ bus for communicating with various sensors supported by IHS 100.

As illustrated, IHS 100 may utilize embedded controller (EC) 120, which may be a motherboard component of IHS 100 and may include one or more logic units. In certain embodiments, EC 120 may operate from a separate power plane from the main/host processor(s) 101 and thus the OS operations of IHS 100. Firmware instructions utilized by EC 120 may be used to operate a secure execution system that may include operations for providing various core functions of IHS 100, such as power management, management of operating modes in which IHS 100 may be physically configured and support for certain integrated I/O functions. In some embodiments, EC 120 and sensor hub 114 may communicate via an out-of-band signaling pathway or bus 124.

As described in additional detail below, in some embodiments, EC 120 may perform various functions to verify the integrity of IHS 100 and its hardware components prior to initialization of the IHS 100 (i.e., in a bare-metal state). For instance, EC 120 may calculate hash value signatures based on instructions and other information used to configure and operate hardware and/or software components of IHS 100, thus validating these components. For example, EC 120 may calculate a hash value based on firmware and on other instructions or settings utilized by a hardware component of IHS 100, such that the hardware component may be included within a root of trusted hardware of IHS 100. In some embodiments, the reference signatures used in such validations may be calculated and encoded in a secured storage of IHS 100 as part of a trusted manufacturing process of the IHS 100.

In various embodiments, chipset 103 may provide processor 101 with access to hardware accelerator(s) 125. Examples of hardware accelerator(s) 125 may include, but are not limited to, INTEL's Gaussian Neural Accelerator (GNA), Audio and Contextual Engine (ACE), Vision Processing Unit (VPU), etc. In some cases, hardware accelerator(s) 125 may be used to perform ML and/or AI operations offloaded by processor 101. For instance, hardware accelerator(s) 125 may load several audio signatures and/or settings, and it may identify an audio source by comparing an audio input to one or more audio signatures until it finds a match.

In some cases, however, hardware accelerator(s) 125 may have significant model concurrency and/or processing latency constraints relative to processor(s) 101. Accordingly, in some cases, context information may be used to select a subset and/or size of data signatures (e.g., audio), also number and/or complexity of models, number of concurrent models (e.g., only two or three models can be processed at a time), and/or latency characteristics (e.g., with 4 signatures or more, detection latency becomes unacceptable) of hardware accelerator(s) 125.

In various embodiments, IHS 100 may not include each of the components shown in FIG. 1. Moreover, IHS 100 may include various other components in addition to those that are shown in FIG. 1. Some components that are represented as separate components in FIG. 1 may be integrated with other components. For example, in some implementations, all or a portion of the features provided by the illustrated components may instead be provided by an SoC.

In a conventional IHS, each application would have to know how to communicate with each specific hardware endpoint 101-124 it needs, which can place a heavy burden on software developers. Moreover, in many situations, multiple applications may request the same information from the same hardware endpoint, thus resulting in inefficiencies due to parallel and/or overlapping code and execution paths used by these applications to perform get and set methods with that same endpoint.

To address these, and other concerns, a platform framework as described herein may enable an overall, comprehensive system management orchestration of IHS 100. Particularly, such a platform framework may provide, among other features, the scalability of multiple applications requesting direct hardware endpoint (e.g., 101-124) access. Additionally, or alternatively, a platform framework as described herein may provide performance optimizations and increased operational stability to various IHS environments.

Figure 2:
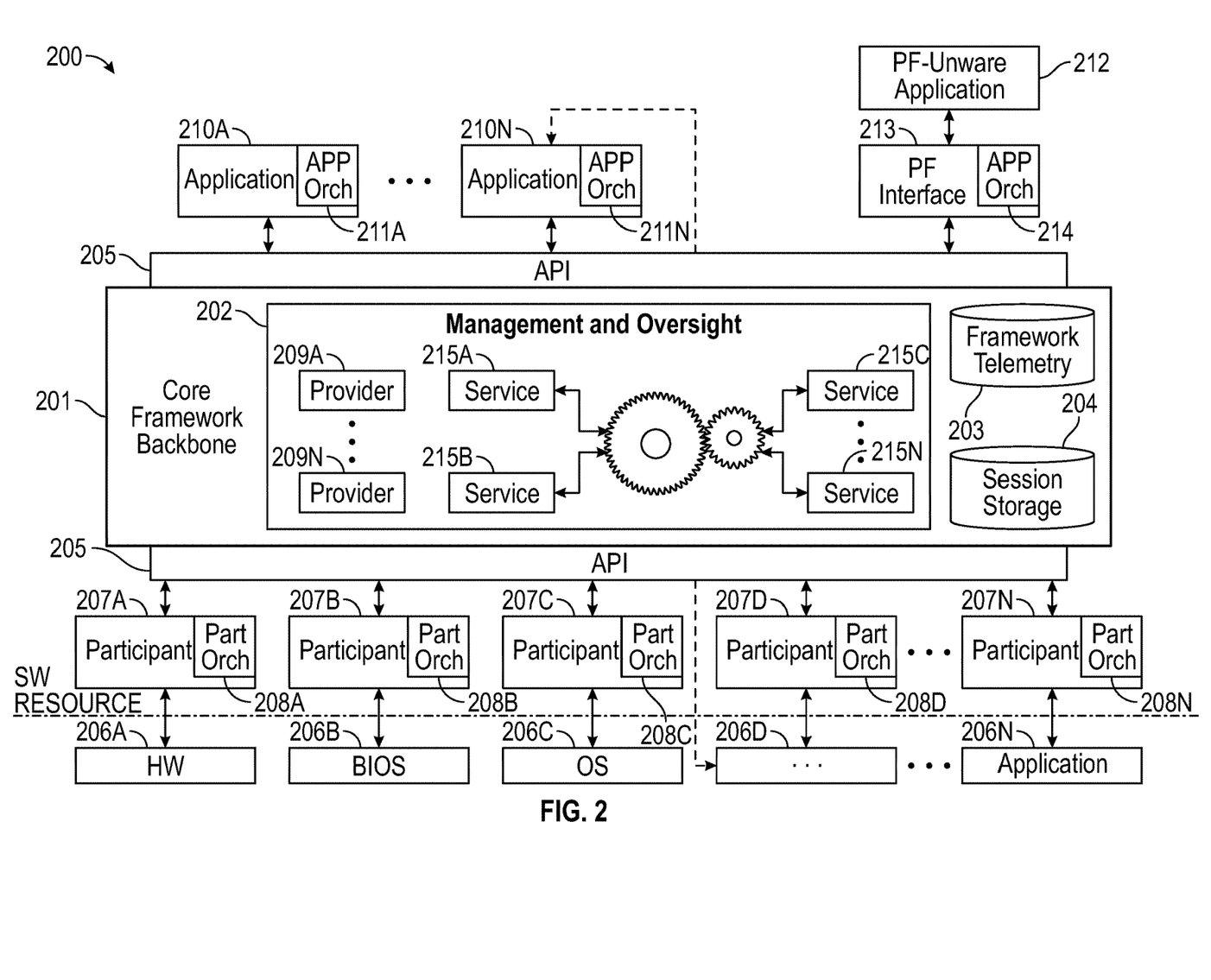
FIG. 2 is a block diagram illustrating an example of a platform framework deployed in an IHS in a manner that supports management of policies for the operation of platform framework resources, according to some embodiments.

FIG. 2 is a block diagram illustrating an example of platform framework 200 that may be configured to support management of policies for the operation of platform framework resources of an IHS. In some embodiments, IHS 100 may instantiate each element of platform framework 200 through the execution of program instructions, stored in a memory (e.g., system memory 105, storage device(s) 119, etc.), by one or more processors or controllers (e.g., processor(s) 101, GPU 107, hardware accelerators, etc.). In some implementations, platform framework 200 may be supported by and/or executed within an OS used by IHS 100, and it may be scaled across user and kernel spaces. Additionally, or alternatively, platform framework 200 may be provided as a software library or an ".exe" file. As shown, platform framework 200 includes core framework backbone 201 and Application Programming Interface (API) 205. Core framework backbone 201 includes management and oversight engine 202 (with services 215A-N), framework telemetry database 203, and session storage database 204.

In operation, platform framework 200 enables the management and orchestration of its participants' communications. The term "participant," as used herein, refers to any entity (e.g., hardware device driver, software module, etc.) configured to register with platform framework 200 by issuing a registration command to management and oversight engine 202 via API 205. Upon registration, each participant may receive a handle usable by services 215A-N within management and oversight engine 202 (and other participants) to address it. In some cases, the handle may be validated by Root-of-Trust (RoT) hardware (e.g., EC 120) as part of the participant registration process. In some instances, the platform framework 200 may provide a handle received from a participant to other validated participants, thus supporting the ability for various types of participants to communicate directly with each other. For example, a handle provided to the platform framework 200 may include a reference to an IPC (Inter-Process Communications) resource of the IHS that is to be used in API communications supported by the participant providing the handle.

In various embodiments, platform framework 200 may include at least three different types of participants: producers, consumers, and providers. Producers are entities (e.g., 207A-N) configured to advertise or publish the capabilities (e.g., variables, primitives, etc.) and statuses of associated hardware (e.g., 206A) or software components (e.g., 206N) to platform framework 200 via API 205, which can then be consumed and/or modified by other participants (e.g., 210A-N). Producers (e.g., 207A-N) may also execute operations with respect to associated hardware components (e.g., 206A-N) based upon instructions (e.g., "set" commands) received from other participants (e.g., 210A-N) via API 205.

On the producer side, resources 206A-N may include, for example, hardware 206A, BIOS 206B, OS 206C, application 206D (a producer role for consumer application 210N), and application 206N (a producer-only application). Each of resources 206A-N may have a producer driver or module 207A-N (a "producer") associated therewith, and each such producer 207A-N may have corresponding orchestrator logic 208A-N that enables its registration and subsequent communications with platform framework 200 via API 205. Once registered, producers 207A-N may provide information to platform framework 200 on their own, upon request by management and oversight engine 202, and/or upon request by any consumer (e.g., 210A-N).

Consumers are entities (e.g., 210A-N) that retrieve data (e.g., a single data item, a collection of data items, data subscribed to from selected producers, etc.) from platform framework 200 using API 205 to then perform one or more actions. On the consumer side, each of consuming applications 210A-N (a "consumer") may have a corresponding orchestrator logic 211A-N that also enables registration and subsequent communications with platform framework 200 using API 205. For example, applications 210A-N may use API 205 commands request data via platform framework 200 from any registered producer 207A-N or provider 209A-N. In the case of application 212 that is not natively aware of, or compliant with, platform framework 200 (e.g., the application uses direct-to-driver access), interface application or plugin 213 and orchestrator logic 214 may enable its inter-operation with platform framework 200 via API 205.

In various embodiments, orchestrator logic 208A-N, 211A-N, and 214 are each a set of APIs to manage a respective entity, such as applications 211A-N, participants 207A-N, and PF interface 213. Particularly, each entity may use its orchestrator interface to register themselves against platform framework 200, with a list of methods exposed within the orchestrator logic's APIs to query for capabilities, events to listen/respond on, and other orchestration operations tied to routing and efficiency.

In some cases, a single application may operate both as a consumer and a producer with respect to platform framework 200. For example, application 210N may operate as a consumer to receive BIOS data from BIOS 206B via API 205. In response to receiving data from producer 207B associated with BIOS 206B, application 210N may execute one of more rules to change the IHS 100's thermal settings. As such, the same application 210N may also operate as producer 206D, for example, by registering and/or advertising its thermal settings to platform framework 200 for consumption by other participants (e.g., 210A) via API 205.

Providers 209A-N are runtime objects that collect data from multiple participants and make intelligent modifications to that data for delivery to other participants (e.g., consumers) through platform framework 200. Despite a provider (e.g., 209A) being an entity within management and oversight engine 202, it may be registered and/or advertised with platform framework 200 as if it were one of producers 207A-N.

As an example, a status provider (e.g., 209A) may collect hardware information from hardware resource(s) 206A and BIOS information (e.g., from BIOS 206B), make a status determination for IHS 100 based upon that data, and deliver the status to platform framework 200 as if it were a hardware component or driver. As another example, a status provider (e.g., 209A) may receive user presence information from sensor hub 114 (e.g., hardware 206A), receive human interface device (HID) readings from OS 209C, make its user own presence determination based upon some concatenation of those two inputs, and publish its user presence determination to platform framework 200 such that other participants do not have to make redundant findings.

API 205 may include a set of commands commonly required of every participant (consumers and producers) of platform framework 200, for example, to perform get or set operations or methods. Predominantly, producers 207A-N may use API 205 to register, advertise, and provide data to consumers (e.g., 210A-N), whereas consumers 210A-N may use API 205 to receive that data and to send commands to producers 207A-N.

Moreover, applications 210A-N may discover all other participants (e.g., hardware 206A and enumerated/supported capabilities, etc.) that are registered into platform framework 200 using API 205. For example, if hardware 206A includes graphics subsystem 107, application 210A may use API 205 to obtain the firmware version, frame rate, operating temperature, integrated or external display, etc. that hardware 206A provides to platform framework 200, also via API 205.

Applications 210A-N may use information provided by platform framework 200 entirely outside of it, and/or they may make one or more determinations and configure another participant of platform framework 200. For example, application 210A may retrieve temperature information provided by hardware 206A (e.g., GPU 107), it may determine that an operating temperature is too high (i.e., above a selected threshold), and, in response, it may send a notification to BIOS 206B via producer 207B to configure the IHS's thermal settings according to a thermal policy. It should be noted that, in this example, by using API 205, application 210A does not need to have any information or knowledge about how to communicate directly with specific hardware 206A and/or BIOS component 206B.

In various implementations, API 205 may be extendable. Once a participant subscribes to, or registers with, platform framework 200 via API 205, in addition to standard commands provided by API 205 itself (e.g., get, set, discovery, notify, multicast, etc.), the registered participant may also advertise the availability of additional commands or services. For instance, express sign-in and/or session management application 210A, thermal policy management application 210B, and privacy application 210C may each need to obtain information from one or more user presence/proximity sensors (e.g., sensors 112) participating in platform framework 200 as hardware providers 206A. In this case, the extensibility of API 205 may allow for the abstraction and arbitration of two or more sensors 112 at the platform framework 200 layer; instead of having every application 210A-C reach directly into sensors 112 and potentially crash those devices and/or driver stacks (e.g., due to contention).

As another example, raw thermal and/or power information may be provided into platform framework 200 by one or more sensors 112 as hardware producers 207A and consumed by two or more applications, such as thermal management application 210A and battery management application 210B, each of which may subscribe to that information, make one or more calculations or determinations, and send responsive commands to BIOS 206C using API 205 in the absence of any specific tools for communicate directly with hardware 206A or BIOS 206B.

As yet another example, provider 209A may communicate with an application 211A, such as a battery management application or OS service, and it may set application or OS service 211A to a particular configuration (e.g., a battery performance "slider bar") using API 205 without specific knowledge of how to communicate directly with that application or OS service, and/or without knowing what the application or OS service is; thus platform framework 200 effectively renders provider 209A application and/or OS agnostic.

Within core framework backbone 201, management and oversight engine 202 includes services 215A-N within platform framework 200 that may be leveraged for the operation of all participants. Examples of services 215A-N include, but are not limited to: registration (e.g., configured to enable a participant to register and/or advertise data with platform framework 200), notification (e.g., configured to notify any registered participant of a status change or incoming data), communication/translation between user and kernel modes (e.g., configured to allow code executing in kernel mode to traverse into user mode and vice-versa), storage (e.g., configured to enable any registered participant to store data in session storage database 204), data aggregation (e.g., configured to enable combinations of various status changes or data from the same or multiple participants), telemetry (e.g., configured to enable collection and storage of data usable for monitoring and debugging), arbitration (e.g., configured to enable selection of one among two or more data sources or requests based upon an arbitration policy), manageability (e.g., configured to manage services 215A-N and/or databases 203/204 of platform framework 200), API engine (e.g., configured to extend or restrict available commands), etc.

Framework telemetry database 203 may include, for example, an identification of participants that are registered, data produced by those participants, communication metrics, error metrics, etc. that may be used for tracking and debugging platform framework 200. Session storage database 204 may include local storage for sessions established and conducted between different participants (e.g., data storage, queues, memory allocation parameters, etc.).

In some implementations, a containerized workspace and/or an application executed therewithin may participate as a producer (e.g., 207A-N/206A-N) or as a consumer (e.g., 210A-N) of platform framework 200. Particularly, IHS 100 may be employed to instantiate, manage, and/or terminate a secure workspace that may provide the user of IHS 100 with access to protected data in an isolated software environment in which the protected data is segregated from: the OS of IHS 100, other applications executed by IHS 100, other workspaces operating on IHS 100 and, to a certain extent, the hardware of IHS 100. In some embodiments, the construction of a workspace for a particular purpose and for use in a particular context may be orchestrated remotely from the IHS 100 by a workspace orchestration service. In some embodiments, portions of the workspace orchestration may be performed locally on IHS 100.

In some embodiments, EC 120 or a remote access controller (RAC) coupled to processor(s) 101 may perform various operations in support of the delivery and deployment of workspaces to IHS 100. In certain embodiments, EC 120 may interoperate with a remote orchestration service via the described out-of-band communications pathways that are isolated from the OS that runs on IHS 100. In some embodiments, network adapter that is distinct from the network controller utilized by the OS of IHS 100 may support out-of-band communications between EC 120 and a remote orchestration service. Via this out-of-band signaling pathway, EC 120 may receive authorization information that may be used for secure delivery and deployment of a workspace to IHS 100 and to support secure communication channels between deployed workspaces and various capabilities supported by IHS 100, while still maintaining isolation of the workspaces from the hardware and OS of IHS 100.

In some embodiments, authorization and cryptographic information received by EC 120 from a workspace orchestration service may be stored to a secured memory. In some embodiments, EC 120 may access such secured memory via an I2C sideband signaling pathway. EC 120 may support execution of a trusted operating environment that supports secure operations that are used to deploy a workspace on IHS 100. In certain embodiments, EC 120 may calculate signatures that uniquely identify various hardware and software components of IHS 100. For instance, remote EC 120 may calculate hash values based on instructions and other information used to configure and operate hardware and/or software components of IHS 100. For instance, EC 120 may calculate a hash value based on firmware and on other instructions or settings of a component of a hardware component. In some embodiments, hash values may be calculated in this manner as part of a trusted manufacturing process of IHS 100 and may be stored in the secure storage as reference signatures used to validate the integrity of these components later. In certain embodiments, a remote orchestration service supporting the deployment of workspaces to IHS 100 may verify the integrity of EC 120 in a similar manner, by calculating a signature of EC 120 and comparing it to a reference signature calculated during a trusted process for manufacture of IHS 100.

EC 120 may execute a local management agent configured to receive a workspace definition from the workspace orchestration service and instantiate a corresponding workspace. In this disclosure, "workspace definition" generally refers to a collection of attributes that describe aspects a workspace that is assembled, initialized, deployed and operated in a manner that satisfies a security target (e.g., the definition presents an attack surface that presents an acceptable level of risk) and a productivity target (e.g., the definition provides a requisite level of access to data and applications with an upper limit on latency of the workspace) in light of a security context (e.g., location, patch level, threat information, network connectivity, etc.) and a productivity context (e.g., performance characteristics of the IHS 100, network speed, workspace responsiveness and latency) in which the workspace is to be deployed. A workspace definition may enable fluidity of migration of an instantiated workspace, since the definition supports the ability for a workspace to be assembled on any IHS 100 configured for operation with the workspace orchestration service.

In specifying capabilities and constraints of a workspace, a workspace definition (e.g., in the form of an XML file, etc.) may prescribe one or more of: authentication requirements for a user, types of containment and/or isolation of the workspace (e.g., local application, sandbox, docker container, progressive web application (PWA), Virtual Desktop Infrastructure (VDI)), applications that can be executed in the defined containment of the workspace with access to one or more data sources, security components that reduce the scope of the security target presented by the productivity environment (e.g., DELL DATA GUARDIAN from DELL TECHNOLOGIES INC., anti-virus software), the data sources to be accessed and requirements for routing that data to and from the workspace containment (e.g., use of VPN, minimum encryption strength), workspace capabilities available to independently attach other resources, whether or not the workspace supports operability across distinct, distributed instances of platform framework 200 (e.g., by including or excluding an identity of another platform framework, or an identity of another workspace with access to a platform framework).

In some implementations, workspace definitions may be based at least in part on static policies or rules defined, for example, by an enterprise's Information Technology (IT) personnel. In some implementations, static rules may be combined and improved upon by machine learning (ML) and/or artificial intelligence (AI) algorithms that evaluate historical productivity and security data collected as workspaces are life cycled. In this manner, rules may be dynamically modified over time to generate improved workspace definitions. If it is determined, for instance, that a user dynamically adds a text editor every time he uses MICROSOFT VISUAL STUDIO from MICROSOFT CORPORATION, then the workspace orchestration service may autonomously add that application to the default workspace definition for that user.

During operation, as an instantiated workspace is manipulated by a user, new productivity and security context information related to the behavior or use of data may be collected by the local management agent, thus resulting in a change to the productivity or security context of the workspace. To the extent the user's behavioral analytics, device telemetry, and/or the environment has changed by a selected degree, these changes in context may serve as additional input for a reevaluation, and the result may trigger the remote orchestration service to produce a new workspace definition (e.g., adding or removing access to the workspace as a consumer or producer to an external or distributed platform framework), extinguish the current workspace, and/or migrate contents of the current workspace to a new workspace instantiated based on the new workspace definition.

In some cases, platform framework 200 may be extensible or distributed. For example, different instances or portions of platform framework 200 may be executed by different processing components (e.g., processor(s) 101 and EC 120) of IHS 100, or across different IHSs. Additionally, or alternatively, independent instances of platform framework 200 may be executed by different workspaces and in secure communications with each other, such that a participant, service, or runtime object's handle may identify the particular platform framework 200 that the participant or service is registered with. Services between these different instances of platform networks may communicate with each other via an Interprocess Communication (IPC) resource specified in a handle provided by the workspace orchestration service for communications with the workspace(s) involved.

In some cases, the workspace definition of a workspace may specify that the workspace: instantiate its own a platform framework, use a platform framework instantiated within another workspace (in the same or different IHS), and/or use a combination of different instances of platform frameworks (one or more of which may be instantiated by another workspace). Moreover, the platform framework option as prescribed by a workspace definition may be based upon the resolution of any of the aforementioned contextual rules (e.g., based on IHS posture, location, user presence, etc.).

As used herein, the term "runtime object" refers to a piece of code (e.g., a set of program instructions) or information that can be instantiated and/or executed in runtime without the need for explicit compilation. For example, in the context of an arbitration operation, the code that executes the arbitration may already be complied, whereas the polic(ies) that the code enforces may change at runtime (e.g., by a user's command in real time) and therefore may be considered "runtime objects."

Figure 3:
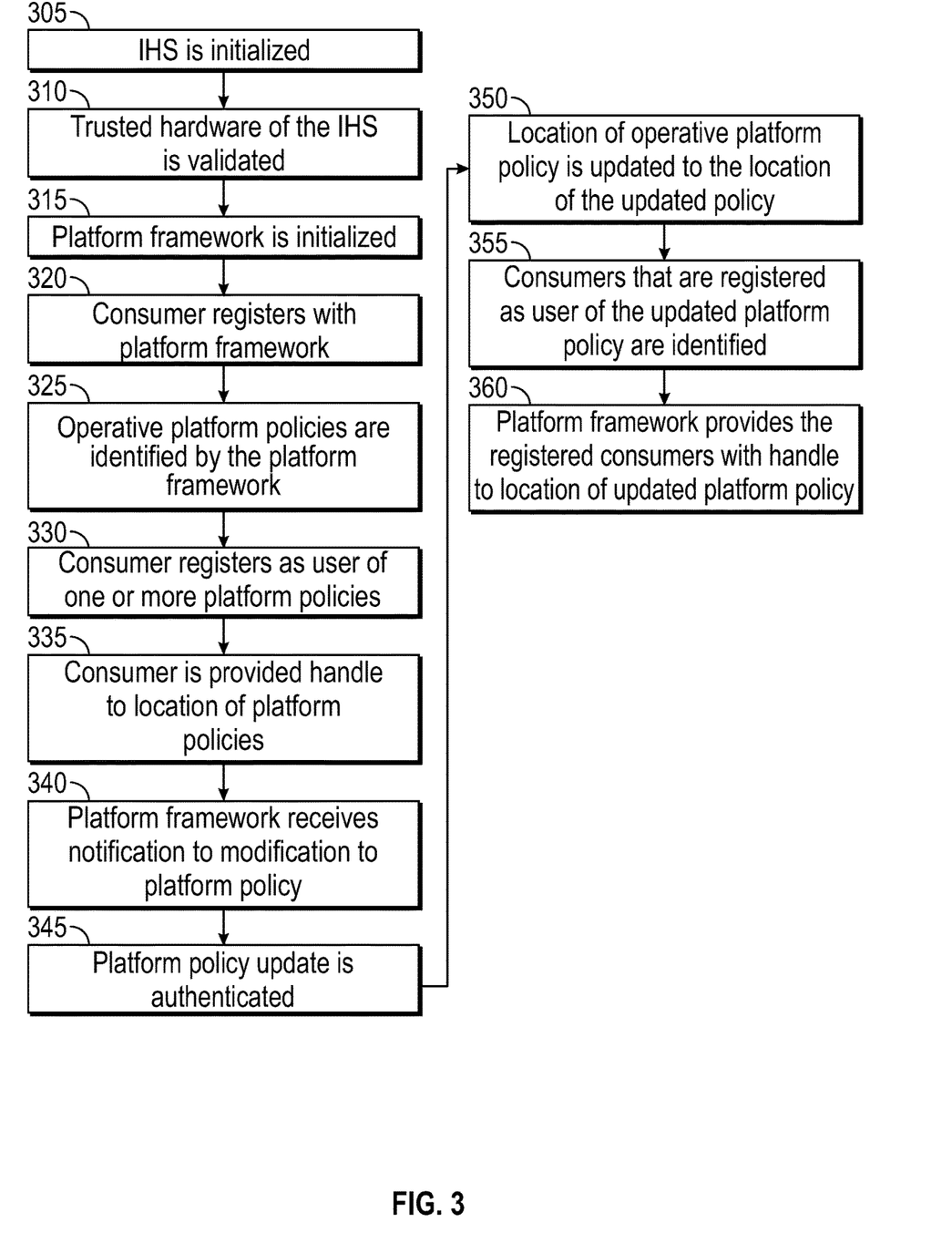
FIG. 3 is a flowchart illustrating an example of a method for supporting management of policies for the operation of platform framework resources of an IHS, according to some embodiments.

FIG. 3 is a flowchart illustrating an example of a method, according to various embodiments, for management of policies used in the operation of platform framework resources of an IHS. Some embodiments may begin at block 305 with the initialization of an IHS, such as described with regard to FIG. 1. In some embodiments, procedures for initializing an IHS may include validation of various hardware components of the IHS, such as by the embedded controller of the IHS of FIG. 1. Accordingly, at block 310, the firmware instructions utilized by various hardware components may be validated against reference signatures for each respective component, thus confirming the hardware component is operating utilizing trusted instructions and is thus a trusted hardware component. Upon validating these hardware components such that they are included within a root of trust, an operating system of the IHS may be booted. With the operating system booted, at block 315, a platform framework for the IHS is initialized, where the platform framework provides a single interface for accessing various resources of the IHS, such as described with regard to FIG. 2.

Figure 4:
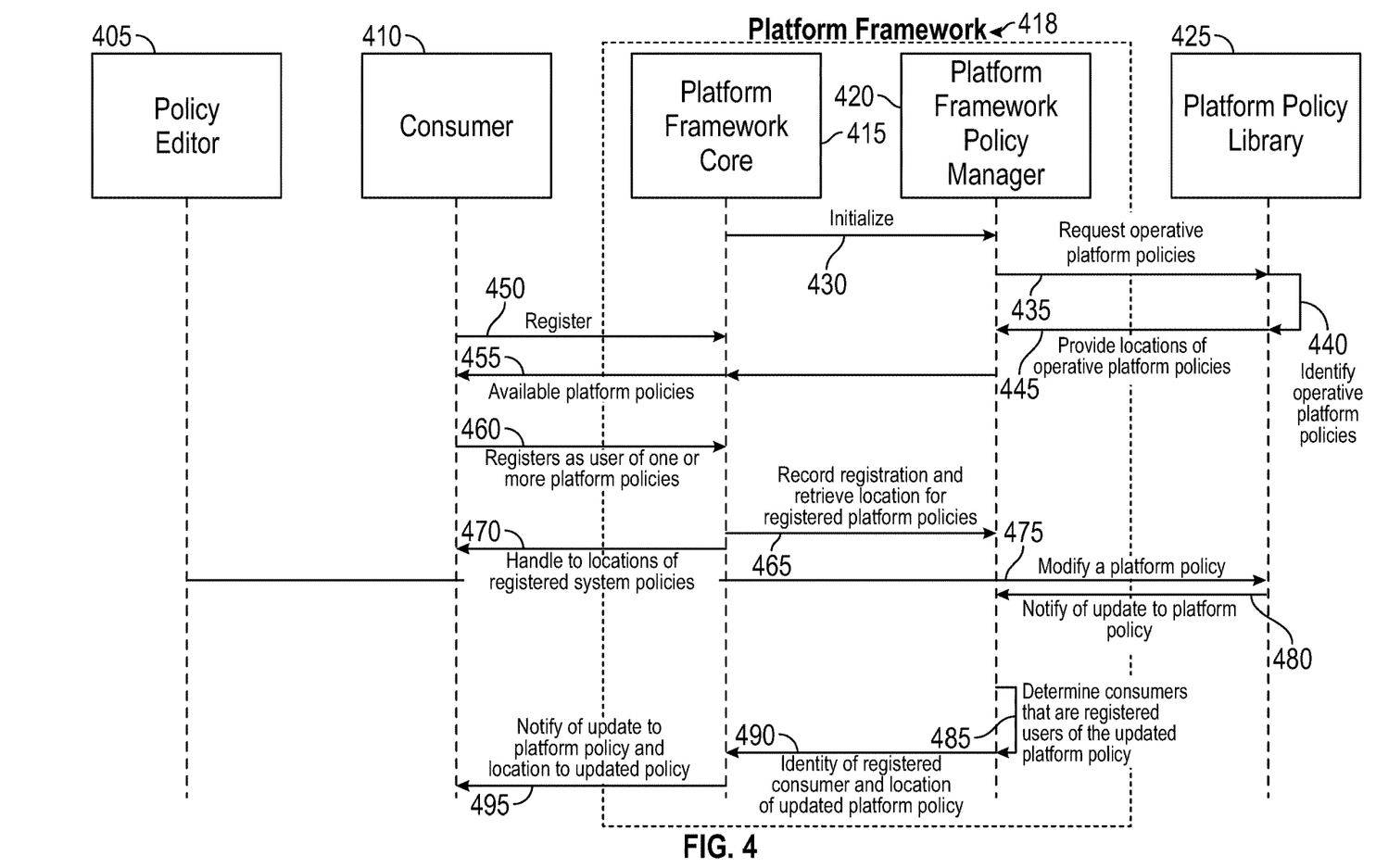
FIG. 4 is a message diagram illustrating certain operations of components of an IHS that are configured to support management of policies for the operation of platform framework resources of an IHS, according to some embodiments.

FIG. 4 is a message diagram illustrating certain operations of components of an IHS that are configured, according to various embodiments, to support management of policies used in the operation of platform framework resources of an IHS. As indicated in FIG. 4, at 430, once the platform framework is initialized, the platform framework core 415 may initialize a policy manager 420 that may operate as a service of the platform framework 418, such as the services of the management and oversight backbone of the platform framework core described with regard to FIG. 2. Upon its initialization, the policy manager 420 may proceed to identify the operative platform policies of the IHS. A wide variety of platform policies may be utilized. Platform policies may specify settings that are used in the operation of hardware components of a platform, such as the IHS described with regard to FIG. 1. For instance, a thermal policy of an IHS may specify various conditions for initiating thermal events, such as through the operation of the cooling system of an IHS, or in cooling operations by various other hardware components of the IHS. For example, a thermal policy may specify temperature settings at which throttling of IHS resources is to be initiated. A thermal policy may additionally or alternatively specify temperature thresholds at which shutdown operations are to be initiated within the IHS.

In some embodiments, a display policy may be another type of platform policy. A display policy may specify display settings to be utilized by one or more of the displays coupled to an IHS. For instance, a display policy may specify events that trigger dimming of the output of the displays, such as based on battery power status information, user presence detection determinations, changes in the security context of the IHS, and/or the information that is being viewed. A display policy may additionally or alternatively specify events that trigger a change to the resolution output of the display monitors, such as in response to offloading of processing tasks from the CPU of the IHS to a graphics controller of the IHS, thus reducing the graphics processing capabilities of the graphics controller.

In existing systems, applications that rely on such types of policies encounter scenarios where the policies can be modified by various different components of an IHS, each operating independently from one another, thus resulting in conflicting platform policies being generated by the different components. For example, a thermal policy provided by an operating system of the IHS may specify a temperature threshold or other type of temperature condition that will trigger throttling of the processing resources of the IHS, which may include the main processors and various other processors and/or controllers. Another thermal policy may be specified by the BIOS of the IHS and may specify its own temperature thresholds for triggering resource throttling. Moreover, in some instances, these thermal policies may be temporarily overridden by some programs operating on the IHS, such as a program that is authorized to temporarily increase temperature thresholds during the operation of certain software programs (e.g., during a videogame, a virtual reality software application, etc.). In such scenarios, platform framework applications implementing or otherwise using a thermal policy must be aware of all these different sources of thermal policy settings. In addition, the platform framework applications implementing a thermal policy must be reconfigured in order to accommodate any changes to any of these sources of thermal policy settings. This results in conflicting policy settings and also results in error-prone implementations that require frequent updates to accommodate changes to any of the platform policies.

Embodiments support the ability for platform policies to be made available to platform framework participants in a standardized manner that also allows the sources of platform policy settings and editors of these policies to maintain their own mechanisms for providing platform policy information to interested participants. Accordingly, embodiments may continue with the policy manager 420 of the platform framework initiating the collection of the operative platform policies, such as the various types of platform policies that are described herein. As illustrated in FIG. 4, the policy manager 420 may interface, at 435, with a platform policy library 425 of the IHS in retrieving the operative platform policies that govern various operations of the IHS. The platform policy library 425 may maintain a repository of platform policy definitions, such as XML files or other structured sources information, that identify the various platform policies that are supported by an IHS configured according to embodiments. In some embodiments, the platform policy definitions may also specify the settings of each particular policy that may be configured. In some embodiments, the platform policy library 425 may be configured to collect the known platform policies upon its initialization, where the platform policy library attempts to identify a valid platform policy for each of the supported platform policy definitions. In some embodiments, upon its initialization, the platform policy library 425 may query various components of the platform framework, operating system, and certain hardware, such as the embedded controller of FIG. 1, to identify the operative platform policies. The platform policy library 425 may also include a repository of default platform policies that are to be utilized each time the IHS is initialized and that will be utilized until a validated policy update is received. At 445, the platform policy library 425 provides the policy manager 420 with the locations of each of the operative platform policies.

With the operative platform policies identified upon initialization of the platform framework core 415, various operations of the IHS may continue, which may include the registration of various framework participants, such as described with regard to FIG. 2. As indicated at 320 of FIG. 3 and at 450 of FIG. 4, the various operations may include the registration of a consumer 410, such as described with regard to FIG. 2, with the platform framework core 415. As part of this registration, the consumer 410 may specify a request for the operative platform policies. Accordingly, at 325, the platform framework core 415 identifies the operative platform policies, such as the default platform policies that were identified by the platform policy library and provided to the platform framework upon its initialization. Based on the polices that have been collected by the policy manager 420, at 455, the platform framework core 415 may provide the registered consumer 410 with the identities of the available platform policies.

At 330 of FIG. 3 and that 460 of FIG. 4, the consumer 410 registers as a user of one or more of the operative platform policies. In some embodiments, such platform policy registrations may be supported by an API of the platform framework 418, such as described with regard to FIG. 2, where the API of the platform framework allows participants to register as a user of a platform policy. Upon receiving a platform policy registration request from a consumer 410, in some embodiments, the platform framework core 415 may validate the consumer 410 that has issued the request. In response to the registration request from consumer 410, at 465, the platform framework core 415 provides the registration to the policy manager 420, where the registrations are recorded. In supporting this recording capability, the policy manager 420 may maintain a repository that identifies registered consumers 410 and also identifies the specific platform policies that each respective consumer has registered as a user of.

In addition to maintaining a mapping of registered consumers 410 to one or more platform policies, the policy manager 420 maintains a location of the operative platform policy for each of the supported policies. As described, upon initialization, the operative platform policies may be default policies stored by the policy library 425. Accordingly, in such scenarios, the policy manager 420 may maintain the locations of default platform policies. As described in additional detail below, the operative platform policies may be modified throughout the ongoing operation of an IHS, where such modifications become the operative platform policy that is maintained by the policy manger 420 and provided to registered consumers 410. Through such operations, the operative platform policies provided by the policy manager 420 may evolve through the operation of an IHS.

As indicated in FIG. 4, at 465, the registration of a consumer as a user of a platform policy results in the policy manager 420 providing the location of the operative platform policy for which the consumer 410 has registered. In some embodiments, the locations of the operative platform policies may be specified through communication handles, such as describe above, by which each of the operative platform policies may be retrieved. In some embodiments, such communication handles may be specified to the policy manager 420 through a platform policy modification API supported by the platform framework, where the policy editors 405 providing modifications to a platform policy may submit a structured file, such as a JSON file, that includes a handle to the updated policy. In some embodiments, the handle may instead be a reference to a location that is maintained by the platform policy library 425.

As indicated at 470 of FIG. 4 and block 335 of FIG. 3, the platform framework core 420 provides the registered consumer 410 with communication handles to the location of the operative platform policy for each of the platform policies that the consumer 410 has registered as a user of. Once the communication handles have been provided by the platform framework, the consumer 410 may utilize the communication handle in retrieving the operative platform policy and using the policy in operating various hardware and/or software components of the IHS. For instance, as described, a thermal policy may specify temperature thresholds at which throttling of IHS processing resources will be initiated. In such instances, consumers 410 registering as users of the thermal policy may be software programs associated with the various hardware components of the IHS that include processing resources that may throttled in response to rising temperatures. In such instances, the communication handle that is provided to the thermal policy consumer 410 provides the location of the operative thermal policy. As described, thermal policies may be specified by various different components of an IHS, including the operating system, authorized software application overrides, BIOS applications and hardware components, such as the embedded controller of FIG. 1. The handle provided to the consumer 410 allows retrieval of the operative thermal policy from locations supported by any one of these components that may submit an updated thermal policy.

With the consumer 410 operating according to the operative platform policy retrieved using the communication handle, various operations of the IHS may continue, which may include the registration of various additional framework participants, such as described with regard to FIG. 2. As the operation of the IHS continues, policy editors 405 may submit modifications to platform policies supported by embodiments. A single platform policy may be modified by various policy editors 405, such as the described operating system processes, BIOS processes and application-specific overrides that may all modify a thermal policy of an IHS. In such a scenario, each of these policy editors 405 may modify the thermal policy of the IHS platform in response to various conditions or events. For instance, the operating system may request increased airflow cooling in anticipation of increased processor loads that will result from a CAD (computer-aided design) program being launched, the BIOS may reduce the thresholds for initiating throttling in response to a fan failure and a gaming application authorized to make platform policy modifications may request an increase in temperature margins in order to accommodate bursts of high processor loads.

Other policy editors 405 may similarly initiate modifications to a platform policy in response to various conditions and events. For instance, in embodiments where the platform policies include a logging policy, a diagnostic application operating on the IHS may modify the logging policy in response to detecting an error condition, or in response to initiating diagnostic operations. Through the modifications to the logging policy, the diagnostic application policy editor 405 may signal various platform framework 418 participants to initiate increased logging protocols that will generate logging outputs that can be collected by the diagnostic application. Once sufficient logging has been conducted or the error condition has been resolved, the diagnostic application may modify the logging policy to revert to prior logging levels. Embodiments support a wide variety of platform components to similarly edit a logging policy such that all platform framework participants that have registered as users of the logging policy are notified of changes made by any authorized editors 405 of the logging policy.

In embodiments where the platform policies include a network policy, various components may modify the network policy, such as to signal a change in the external networks that may be utilized by the IHS. For instance, an operating system application that is a policy editor 405 may modify the network policy to restrict the IHS to use of corporate wireless networks in response to a financial application being launched. A containerized workspace, such as described with regard to FIG. 2, that is a policy editor 405, may modify the network policy to restrict the IHS to use of a specific encrypted network while highly protected data is being accessed via the workspace. In such instances, embodiments thus enable policy editors 405 such as the described workspaces to modify platform operations via the platform framework while maintaining the workspace's isolation from the underlying hardware of the IHS. In some instances, such network policies that restrict the networks that are allowed for use by a workspace may be specified in the workspace definition used to build and operate the workspace.

In embodiments where the platform policies include an authentication policy, various components may modify the authentication policy, such as to signal a change to the authentication requirements that are being required for use of the IHS, or for use of an application or data. For instance, a security application that is a policy editor 405 may modify an authentication policy to signal that successful identification of the user via a fingerprint reader of the IHS will be required in order for the user to login to the operating system of the IHS, or to launch a containerized workspace available via the IHS. Another application that is a policy editor 405 may modify the authentication policy to prohibit use of the internal camera of the IHS for facial recognition, or to prohibit all use of the camera, in response to a change in a privacy setting of the IHS.

In embodiments where the platform policies include a user presence detection policy, various components may modify the user presence detection policy in a variety of manners. For instance, a security application that is a policy editor 405 may specify various types of presence detection thresholds within a user presence detection policy that is to be utilized by the IHS. For example, such a user presence detection policy may specify a proximity threshold that must be satisfied in order to generate an indication that the user is in proximity to the IHS, such as within a 5 foot proximity to the IHS, or within a 20 foot proximity to the IHS, or within any detectable proximity to the IHS, where such proximity thresholds may be selected for use based on the security classification of the data or applications that are in use, or based on the location of the IHS. Another application that is a policy editor 405 may issue a user presence detection policy modification that specifies that certain hardware is not allowed for use, such as prohibiting use of a camera or of an external display of the IHS based on a change in privacy settings. In another example, a workspace that is a policy editor 405 may specify a certainty threshold that must be met in order to generate an indication of user proximity, where the workspace may issue a changed in proximity requirements in response to the user accessing protected data. In such instances, such proximity threshold information may be specified within the workspace definition that is provided by a remote orchestrator and is used to construct and operate the workspace.

In this manner, a variety of platform polices may be modified by various policy editors 405 of an IHS. As indicated at 475 of FIG. 4 and 340 of FIG. 3, policy editors 405 may submit modifications to a platform policy to a platform policy library 425, or in some embodiments, may submit modifications directly to the platform framework policy manager 420. As indicated at 345, in some embodiments, the policy update being presented by the policy editor 405 may be authenticated, such as by the platform policy library 425 that receives the modification. As describe above, hardware and software components of an IHS may be validated as authentic based on confirmation that instructions utilized by the component are identical to a set of trusted reference instructions for the component, where such reference instructions may be provided during assembly of an IHS, or from a trusted source, such as the embedded controller of FIG. 1. In some embodiments, the platform framework 418 and/or platform policy library 425 may verify that a policy editor 405 that submits the modification to platform policy is validated in such a manner. As described above, a policy editor 405 may submit a policy modification as a structured file, such as a JSON, where a communication handle to the location of the updated policy is included in the file. In some embodiments, the structured file by which the policy modification is submitted may also include a token provided by the policy editor 405.

In some embodiments, a policy editor 405 may include a token in a platform policy modification that is submitted to the platform framework 418 and/or platform policy library 425. This token that is presented by a policy editor 405 may be validated as having been provided to the policy editor 405 by a trusted platform resource, thus authorizing the policy editor to submit platform policy modifications. Upon receiving a platform policy update, the platform policy library 425 may submit such a token to a trusted resource of the IHS, such as the embedded controller 120 described with regard to FIG. 1, in order to validate that the token was generated by this trusted resource. Based on confirmation that the token provided by the policy editor 405 has been provided by the trusted resource, as indicated at 350 of FIG. 3, the platform policy library 425 updates the location of the operative platform policy to the location of the updated policy provided by the policy editor 405.

Once the updated platform policy has been validated and designated as the operative policy, at 480, the platform policy library 425 notifies the platform framework policy manager 420 of the update. Based on the described mapping of registrants maintained by the policy manager 420, at 485 of FIG. 4 and at 355 of FIG. 3, the policy manager determines the consumers 410 that have registered as users of the platform policy that has been updated. At 490, the policy manager 420 notifies the platform framework core 415 of the policy update, along with the identity of the consumers 410 that have registered as users of the platform policy and also along with the location of the updated policy, where the provided location may be in the form of the described communication handle that may be provided by the policy editor 405. The platform framework core 415 may then proceed, at 495 of FIG. 4 and at 360 of FIG. 3, to provide each of the registered consumers with a notification of the updated platform policy and a location of the updated policy. The consumer 410 may then retrieve the updated policy, in some cases using a communication handle provided in the notification of the update. Using the communication handle, the consumer 410 may retrieve the updated policy, thus allowing the consumer 410 to be provided policy updates from policy editors 405 that the consumer 410 is not otherwise configured to interface with or that the consumer 410 is even aware of. In some embodiments, the policy updates themselves may be maintained by the platform policy library 425, in which case the updates may be provided to the consumer 410 directly via the update notification from the platform framework core 415, or may be provided via a communication handle to a stored location that is supported by the platform policy library 425. Utilizing these capabilities provided by embodiments, platform policies may be distributed in a uniform manner to platform framework participants.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
    a plurality of hardware devices, each operated at least in part according to one or more platform policies, and each accessed using one or more registered participants of a platform framework;
    a processor; and
    a memory coupled to the processor, the memory having program instructions stored thereon that, upon execution, cause the platform framework of the IHS to:
        receive, from an application of the IHS, a registration as a user of a first platform policy that is used to operate one or more of the hardware devices of the IHS;
        provide the application with a first communication handle for use in retrieving the first platform policy;
        receive a notification of an updated first platform policy that modifies the operation of the one or more hardware devices of the IHS;
        identify the application as a registered user of the first platform policy; and
        provide the application with a second communication handle for use in retrieving the updated first platform policy specifying the modified operation of the one or more hardware devices.

2. The IHS of claim 1, wherein the application of the IHS comprises an application operating in a secure execution environment of an embedded controller of the IHS.

3. The IHS of claim 1, wherein the first communication handle comprises a reference to IPC process that supports an API used to retrieve the first platform policy.

4. The IHS of claim 1, where the first communication handle comprises a token that validates the authenticity of the first platform policy that is retrieved by the first communication handle.

5. The IHS of claim 1, wherein the first platform policy comprises a thermal policy that specifies a temperature threshold for initiating throttling of processing resources of the IHS.

6. The IHS of claim 5, wherein the thermal policy is updated by a BIOS of the IHS and wherein the thermal policy is further updated by an operating system of the IHS.

7. The IHS of claim 1, wherein the first platform policy comprises a user presence detection policy that specifies thresholds for determining whether a user is in proximity to the IHS.

8. The IHS of claim 7, wherein the thresholds of the user presence detection policy comprise a threshold distance of a detected individual from the IHS for signaling that the individual is in proximity to the IHS.

9. The IHS of claim 7, wherein the user presence detection policy further specifies one or more of the hardware devices of the IHS that are to be utilized in user presence detection by the IHS.

10. The IHS of claim 1, wherein the first platform policy comprises a display policy that specifies settings to be utilized by one or more displays of the IHS.

11. The IHS of claim 10, wherein the display policy settings comprise settings for dimming outputs by the one or more displays of the IHS.

12. The IHS of claim 10, wherein the display policy settings comprise settings for adjusting the resolution of outputs of the one or more displays of the IHS.

13. The IHS of claim 1, wherein the first platform policy comprises a logging policy that specifies logging levels to be utilized by one or more of the hardware devices of the IHS.

14. The IHS of claim 1, wherein the first platform policy comprises a network policy that specifies one or more networks that are authorized for use by the IHS.

15. The IHS of claim 1, wherein the first platform policy comprises an authentication policy that specifies one or more of the hardware devices of the IHS to be utilized in authenticating a user of the IHS.

16. A memory storage device having program instructions stored thereon that, upon execution by an Information Handling System (IHS), cause the IHS to:
    receive, from an application of the IHS, a registration as a user of a first platform policy that is used to operate one or more of the hardware devices of the IHS;
    provide, by a platform framework of the IHS, the application with a first communication handle for use in retrieving the first platform policy;
    receive a notification of an updated first platform policy that modifies the operation of the one or more hardware devices of the IHS;
    identify, by the platform framework of the IHS, the application as a registered user of the first platform policy; and
    provide, by the platform framework of the IHS, the application with a second communication handle for use in retrieving the updated first platform policy specifying the modified operation of the one or more hardware devices.

17. The memory storage device of claim 16, where the first communication handle comprises a token that validates the authenticity of the first platform policy.

18. The memory storage device of claim 16, wherein the first platform policy comprises a thermal policy that specifies a temperature threshold for initiating throttling of processing resources of the IHS.

19. A method, comprising:
- receiving, from an application of an IHS (Information Handling System), a registration as a user of a first platform policy that is used to operate one or more of the hardware devices of the IHS;
- providing, by a platform framework of the IHS, the application with a first communication handle for use in retrieving the first platform policy;
- receiving a notification of an updated first platform policy that modifies the operation of the one or more hardware devices of the IHS;
- identifying, by the platform framework of the IHS, the application as a registered user of the first platform policy; and
- providing, by the platform framework of the IHS, the application with a second communication handle for use in retrieving the updated first platform policy specifying the modified operation of the one or more hardware devices.

20. The method of claim 19, wherein first communication handle comprises a reference to IPC process that supports an API used to retrieve the first platform policy, and wherein the first communication handle further comprises a token that validates the authenticity of the first platform policy.

* * * * *